United States Patent [19]
Vikhirev et al.

[11] 3,958,896
[45] May 25, 1976

[54] HYDRAULIC MACHINE

[76] Inventors: Vitaly Viktorovich Vikhirev,
Svetlanovsky prospekt, 101, kv.
278; Valentina Vasilievna Loktaeva,
prospekt Prosveschenia, 104, kv.
344; **Grigory Abramovich
Bronovsky,** 7 Sovetskaya ulitsa, 7,
kv. 6; Rady Kirillovich Fasulati,
ulitsa Tukhachevskogo, 35, kv. 23,
all of Leningrad, U.S.S.R.

[22] Filed: Dec. 2, 1974

[21] Appl. No.: 528,994

[52] U.S. Cl............................ 415/151; 415/163
[51] Int. Cl.² ............................................ F01D 21/06
[58] Field of Search.................... 415/163, 151, 200

[56] References Cited
UNITED STATES PATENTS

| | | |
|---|---|---|
| 1,723,254 | 8/1929 | Popp.................................. 415/200 |
| 2,713,643 | 7/1955 | Rheingans........................... 415/163 |
| 2,945,960 | 7/1960 | Obrist................................. 415/163 |
| 3,186,685 | 6/1965 | Chatfield et al..................... 415/163 |
| 3,861,822 | 1/1975 | Wanger............................... 415/151 |

*Primary Examiner*—Henry F. Raduazo
*Attorney, Agent, or Firm*—Fleit & Jacobson

[57] ABSTRACT

A hydraulic machine, wherein means for rotating guide apparatus vanes comprises a control ring and at least two actuating motors. Each actuating motor is movably connected to the control ring. The control ring is operatively connected to each vane of the guide apparatus. The actuating motor is fixed to a support member which is rigidly fixed to embedded parts of the hydraulic machine and cast in concrete.

2 Claims, 2 Drawing Figures

HYDRAULIC MACHINE

The present invention relates to the field of construction of hydraulic machine-building, and in particular to hydraulic machines.

The invention may be the most advantageously used in the construction of powerful hydraulic machines, for example, radial-axial hydraulic turbines of 500 MW capacity.

Known in the art is a hydraulic machine having means for rotating vanes of a guiding apparatus comprising a control ring and two actuating motors. The control ring is operatively connected with each vane of the guide apparatus. Each actuating motor is movably connected with the control ring and is fixed to a support member. A piston is disposed in the housing of the actuating motor, and a pull rod is connected to the piston by means of a pin. The pin allows the movement of the pull rod in a horizontal plane. The other end of the pull rod is connected, by means of a cylindrical pin, to the control ring so that the actuating motor is movably connected to the control ring. The force is transmitted from the actuating motor to the control ring and further, from the control ring to levers of the guide apparatus vanes through shackles. The housing of the actuating motor has a flange which is used to fix the motor to a flange of a recess for accommodation of the actuating motor. The recess comprises a steel structure of a round or square cross-section which is welded to the lining of a shaft for installation of the hydraulic machine. The recess for accommodation of the actuating motor and the shaft for the hydraulic machine are cast in concrete. The position of the flange of the recess for accommodation of the actuating motor depends on the accuracy of the installation of the recess itself during the assembly. This operation is rather labour consuming and cannot provide for sufficient accuracy in positioning the flange of the recess for accommodation of the actuating motor, especially where high power output hydraulic turbines are assembled. Therefore, in order to ensure normal operation of the actuating motor, that is to obtain the correct position of the pull rod of the actuating motor with respect to the control ring, an accurate alignment of the axis of the actuating motor with the axis of the control ring is required which increases labour consumption and time spent for assembly operations. Besides, the actuating motors can be accommodated in recesses only in the zone of small cross-sectional area of the scroll casing used for supplying water to the turbine runner which may prove inconvenient from the point of view of location of hydraulic pressure units supplying actuating motors with oil under pressure.

The provision of a pull rod in the construction of the actuating motor with such an arrangement of actuating motors results in differences in forces transmitted to the control ring from actuating motors so that the friction force in the control ring support is increased, and the actuating motor of a larger diameter is to be used thus resulting in an increased metal consumption in the manufacture of the hydraulic machine. The use of the recess for accommodation of the actuating motor also results in an increased metal consumption.

Known in the art is another type of hydraulic machine, in this hydraulic machine, means for rotating vanes of the guide apparatus comprises a control ring which is operatively connected with each vane of the guide apparatus, and four actuating motors coupled into pairs. Each actuating motor is movably connected with the control ring. The housing of two actuating motors are interconnected by means of an intermediate member receiving a pin cantilevered in the control ring. The intermediate member is provided with a flange which is used to fix the actuating motor to a support member mounted on the turbine cover or on the thrust bearing pad of the water turbine. During the operation of the actuating motor, upon the transmission of a force from the pull rod to the control ring pin, a great additional slide friction force is developed between the pull rod and the ring so that the diameter of the actuating motors is to be increased thus increasing the weight of metal used for hydraulic turbine construction. The installation of the actuating motors over the control ring requires a certain offset of the control ring pin. The force transmitted from the actuating motor to the control ring develops a torque deforming the control ring so that the friction in pins driving the guide apparatus vanes increases thus requiring a larger diameter of the actuating motor.

The installation of the actuating motors on the turbine cover or on the thrust bearing pad results in an additional load applied to the cover. Stress concentration is created in the cover at the point of fastening which requires a reinforcement of the cover and, hence, weight of hydraulic machine increases.

Known in the art is still another hydraulic machine. This means comprises a control ring and actuating motors. The control ring is operatively connected with each guide apparatus vane. Each actuating motor is connected with the control ring and fixed to a support member. The support member comprises the control ring itself, and the cylinders of the actuating motors are fixed directly to the control ring. The housings of the actuating motors are rigidly fixed to the control ring. The piston of each actuating motor is connected to embedded parts of the hydraulic machine by means of cables. During the control operation, oil is supplied into the inner space of each actuating motor, the cylinders of the actuating motors are displaced together with the control ring, the actuating motor piston performing no progressive motion. With this type of fastening, supply of oil to the actuating motor is rather difficult because of its movement, and a special flexible coupling should be provided between the motor piston and the embedded parts of the hydraulic machine so as to feed oil into the cylinder of the actuating motor through this coupling. The embedded parts of the hydraulic machine are the parts, such as the stator rim and scroll casing which are cast in concrete. The fastening of the piston to the embedded parts of the hydraulic machine by means of the cable cannot provide for any rigid fixing of the piston due to the elongation of the cables so that the angle of rotation of the control ring is diminished compared to the preset angle of rotation. This is due to the fact that, upon an elongation of the cables, the piston can perform a translatory motion along the cables. With the rigid cables, which are not elongated, the cylinder of the actuating motor will move together with the control ring after the pressure application to the cylinder, and the piston remains stationary. In that case the cylinder stroke depends on the distance between the piston end and the bottom wall of the cylinder. When the cable is elongated, the piston will axially move upon the pressure application, thereby diminishing the distance between the piston end and the bottom wall of the cylinder, whereby the angle of rotation of the control ring is reduced, and the angle of rotation of the guide apparatus vanes also decreases. The latter fact results in a reduced power output of the turbine with the completely opened guide apparatus.

Also known in the art is another hydraulic machine wherein means for rotating guide apparatus vanes comprises a control ring and actuating motors. The control ring is operatively connected to each guide apparatus vane. Each actuating motor is movably connected with the control ring and fixed to a support member.

The actuating motors are fastened in the following manner. The housing of each actuating motor is provided with a flange, and the motor is movably connected with the support member by means of this flange. The support member is mounted in the turbine cover. On the other hand, the weight of the actuating motor is absorbed by supporting it by means of another support member fixed to the cover.

Since the support member is fastened to the turbine cover, the cover takes up the moment developed by the reaction force of the actuating motors. This moment is rather great since the actuating motor is mounted in a spaced relationship to the cover plane so as to accommodate the transmission links connecting it with the guide apparatus vanes. The larger the turbine (diameter and output), the greater the distance between the axis of the actuating motor and the fastening points of the support member, and thus the greater the moment. This bending moment gives rise to local stress concentrations in the cover thus making its necessary to reinforce the cover, and, hence, to increase its weight. This results in an increased metal consumption in manufacturing the hydraulic machine.

In addition, the bending moment deforms the cantilever support member thus resulting in jamming of the support pin in a bush press fitted in the actuating motor flange. This results in an increased wear of the bush and requires frequent disassemblies of the actuating motors with unproductive time losses in the operation of the hydraulic machine.

Closer location of the fastening points of the support member results in greater reaction forces developed in the fastening points. Since the force vector of the actuating motor changes its direction upon opening and closure of the guide apparatus vanes, reaction forces in the fastening points of the support member also change their direction. Changes in sign of the reaction forces weaken the fastening of the support member so that it can be become loosened.

It is an object of the invention to reduce the metal consumption for construction of a hydraulic machine by diminishing the cover weight by relieving it of the reaction forces of the actuating motors, as well as by locating the actuating motors directly adjacent to a hydraulic pumping unit.

Another object of the invention is to reduce the labour consumption in the manufacture and assembly of large-size hydraulic machines due to an improved structure of the fastening of actuating motors eliminating the manufacture of recesses for accommodation of the actuating motors and solid support members, as well as accurate alignment of the actuating motor axis with respect to the control ring.

These objects are accomplished due to the fact that in a hydraulic machine having means for rotating guide apparatus vanes comprising a control ring operatively connected with each guide apparatus vane, and at least two actuating motors each being movably connected to the control ring and mounted on a support member, according to the invention, the support member is rigidly fixed to embedded parts of the hydraulic machine and cast in concrete.

The hydraulic machine having such a construction of the fastening of the actuating motors of means for rotating guide apparatus vanes eliminates the accurate alignment of the axis of the actuating motor with respect to the control ring during the assembly of the hydraulic machine.

This construction of the actuating motor permits one to dispense with the provision of recesses in the shaft for installation of the hydraulic machine so that the support members can now be preassembled with the embedded parts of the hydraulic machine, while the accurate alignment of the axis of each actuating motor is made at the plant during the manufacture of the hydraulic machine. This permits one to considerably reduce the time spent for assembly of powerful hydraulic machines.

The embedded parts of the hydraulic machine are the parts, such as the stator rim and scroll casing which are cast in concrete. The stator rim takes up the load from the conrete mass disposed over the scroll casing, as well as the load created by the weight of the runner parts. The cover of the hydraulic machine (turbine cover) and the base ring are fixed to the stator rim.

In addition, the hydraulic machine according to invention having the above-described fastening of the actuating motors has a considerably lighter cover due to its relief from the reaction forces of the actuating motors. The support member taking up the reactive forces of the actuating motors is fixed to the embedded parts and cast in concrete so that the concrete absorbs the reaction forces of the actuating motors, while the cover is completely unloaded and can be manufactured to have a light weight. The absence of any assemblies for fastening the support members to the cover, as well as the opportunity of more convenient arrangement of the actuating motors vis-a-vis the hydraulic pumping unit due to the elimination of the recesses generally result in a reduced metal consumption in the manufacture of the hydraulic machine.

Each support member is preferably rigidly fixed to the stator rim embedded in concrete, because the entire machine is assembled thereon, the test assembly being made at the plant. This permits one to effect the labour consuming operation of alignment of the axis of the actuating motor with respect to the control ring directly in the course of manufacture of they hydraulic machine. It should be noted that in the manufacture of small-size hydraulic machines, the support members can be fixed to other embedded parts, such as the scroll casing.

Other objects and advantages of the invention will become apparent from the following detailed description of a specific embodiment thereof with reference to the accompanying drawings, which:

Figure 1:
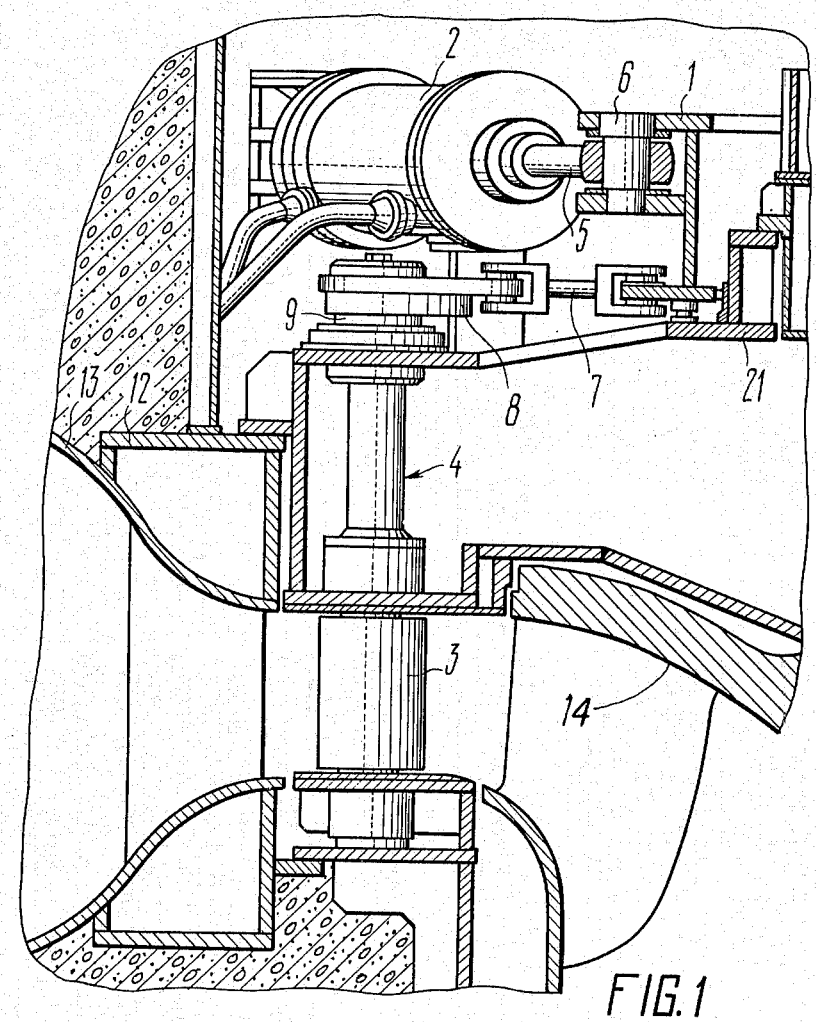
FIG. 1 shows a longitudinal section of a part of the hydraulic machine according to the invention.

The hydraulic machine according to the invention, has means for rotating guide vane apparatus which comprises a control ring 1 (FIG. 1) and at least two actuating motors 2 adapted to rotate vanes 3 of the guide apparatus 4 of the hydraulic machine.

Each actuating motor 2 is movably connected to the control ring 1 by means of a piston rod 5. The control ring 1 is operatively connected to each vane 3 of the guide apparatus 4. The movable connection of the actuating motor 2 to the control ring 1 is provided by means of a cylindrical pin 6. The operative connection of each vane 3 to the control ring 1 is provided by means of a shackle 7 and a lever 8 which is connected to a journal 9 of the vane 3.

The actuating motor 2 has a flange 10 (FIG. 2) located on the housing of the actuating motor and adapted to be fixed to a support member 11. The support member 11 is rigidly fixed to embedded parts of the hydraulic machine and cast in concrete. The embedded parts include a stator rim 12 and a scroll casing 13 for supplying water to a runner 14 (FIG. 1) of the hydraulic machine, all these parts being cast in concrete.

In this example the support member 11 is shown fixed to the stator rim 12 to illustrate the most preferable solution in the case of large-size hydraulic machine.

The flange 10 (FIG. 2) has an eyelet 15. The support member 11 is provided with an eyelet 16, which is fixed e.g. with bolts 17.

Figure 2:
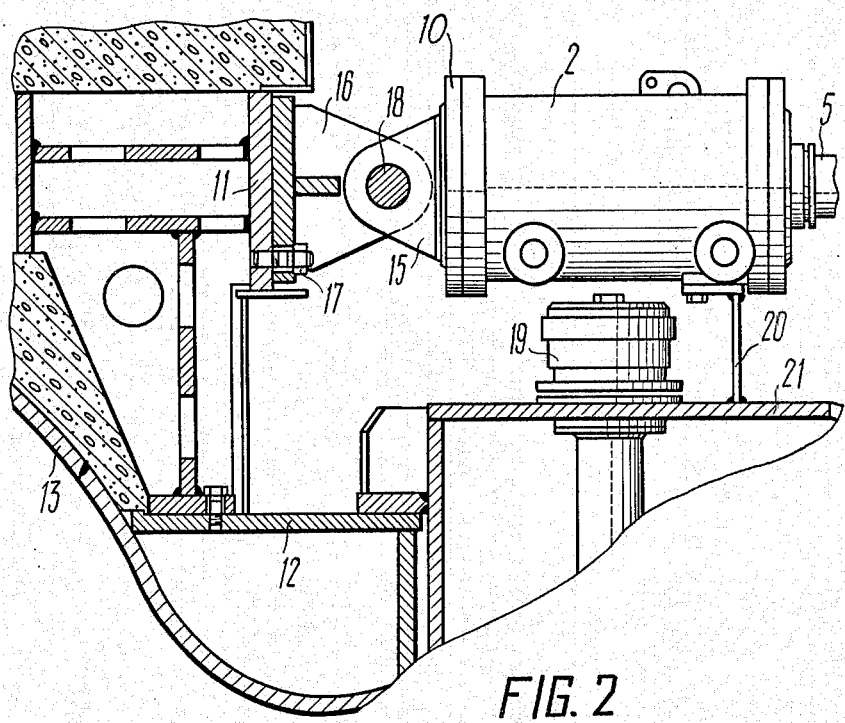
FIG. 2 shows an enlarged sectional view illustrating the detail of fastening of an actuating motor to a support member.

The eyelets 15 and 16 are interconnected by means of a cylindrical pin 18. The connection by means of the pin 18 provides for opportunity of displacing (lifting) the actuating motor 2 in a vertical plane for inspection or replacement of a bearing 19 of the vane 3 (FIG. 1).

The horizontal position of the actuating motor 2 is established by means of a column 20 (FIG. 2) mounted on a cover 21 so that the end of the actuating motor 2 opposite to the eyelet 15 is supported by the column 20.

During the control of the vanes 3 of the guide apparatus 4, oil pressure is applied to the piston of the actuating motor 2 having its piston rod 5 operatively connected to the control ring 1, which is in turn, operatively connected to the vanes 3 of the guide apparatus 4. The oil pressure applied to the piston also acts on the housing of the actuating motor 2 to develop a reaction force which is to be balanced. The reactive force is transmitted, via the eyelets 15, 16 (FIG. 2) and the pin 18, to the support 11 and is absorbed by concrete. The reaction forces in large-size hydraulic turbines can be of a considerable value. Thus, for a hydraulic turbine of an output of 500 MW, with a water head of 180 m, this force may be as great as 160 ton. The transmission of this force to the concrete permits to eliminate the application of locally concentrated moments and reaction forces to the cover 21 of the turbine at each fastening point of the actuating motor by about 150–160 ton (where four actuating motors are used). Therefore, the weight of the turbine cover 21 may be lighter by about 10% compared to known constructions (or by 30 ton. in this specific example).

What is claimed is:

1. Guide apparatus for a hydraulic motor having component parts fixedly embedded in a concrete structure comprising, in combination, a plurality of rotatably mounted vanes, a movably mounted control ring, means for operatively connecting said control ring to said plurality of vanes, at least two actuating motors operatively connected to said control ring for moving said control ring to rotate said plurality of vanes, a plurality of support members, means for mounting said support members on one of the component parts of the hydraulic machine embedded in the concrete structure and means for supporting each of said actuating motors on one of said support members.

2. Guide apparatus in accordance with claim 1 wherein one of the component parts of the hydraulic motor embedded in the concrete structure comprises a stator rim and wherein said support members are mounted by said mounting means on said stator rim.

* * * * *